(12) United States Patent
Noda et al.

(10) Patent No.: US 8,228,618 B2
(45) Date of Patent: Jul. 24, 2012

(54) DRIVE MECHANISM, DRIVE DEVICE, AND LENS DRIVE DEVICE

(75) Inventors: Atsuhiro Noda, Ashiya (JP); Takashi Matsuo, Suita (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 13/000,252

(22) PCT Filed: Jun. 16, 2009

(86) PCT No.: PCT/JP2009/060931
§ 371 (c)(1),
(2), (4) Date: Dec. 20, 2010

(87) PCT Pub. No.: WO2010/001716
PCT Pub. Date: Jan. 7, 2010

(65) Prior Publication Data
US 2011/0102917 A1    May 5, 2011

(30) Foreign Application Priority Data
Jul. 1, 2008  (JP) .................... 2008-172226

(51) Int. Cl.
*G02B 15/14* (2006.01)
(52) U.S. Cl. ........................ 359/696; 359/694
(58) Field of Classification Search ............ 359/694, 359/695
See application file for complete search history.

(56) References Cited

U.S. PATENT DOCUMENTS
2011/0031924 A1* 2/2011 Honda .................. 318/634

FOREIGN PATENT DOCUMENTS

| JP | 02-167596 A | 6/1990 |
|---|---|---|
| JP | 08-055402 A | 2/1996 |
| JP | 10-068979 A | 3/1998 |
| JP | 2001-153715 A | 6/2001 |
| JP | 2008-040193 A | 2/2003 |
| JP | 2007-058075 A | 3/2007 |
| JP | 2007-058076 A | 3/2007 |
| JP | 2007-060530 A | 3/2007 |
| WO | WO 2010/001716 A1 | 1/2010 |

* cited by examiner

*Primary Examiner* — James Jones
(74) *Attorney, Agent, or Firm* — Cozen O'Connor

(57) ABSTRACT

Provided is a drive mechanism comprising a stationary support member, a lever member having a displacement input portion for receiving a moving force from the outside and a bearing portion for abutting against the support member, so that the lever member engages with a driven member and swings on the bearing portion relative to the support member in response to the input of the moving force to the displacement input portion, thereby moving the driven member in a predetermined first axis direction, and a shape-memory alloy actuator for applying the moving force to the displacement input portion. The drive mechanism is characterized in that a displacement input member having the displacement input portion and a bearing member having the bearing portion are formed, in the lever member, of a material different from that of the lever member.

10 Claims, 4 Drawing Sheets

DRIVE MECHANISM, DRIVE DEVICE, AND LENS DRIVE DEVICE

RELATED APPLICATIONS

This application is a U.S. National Stage Application under 35 U.S.C. 371 of International Application No. PCT/JP2009/060931, filed with Japanese Patent Office on Jun. 16, 2009, which claims priority to Japanese Patent Application No. 2008-172226, filed Jul. 1, 2008.

FIELD OF THE INVENTION

The present invention relates to a drive mechanism, drive device, and lens drive device.

BACKGROUND

In recent years, there has been a drastic increase in the number of pixels of an image pickup element mounted on a small-sized portable terminal such as a camera-mounted cellular mobile telephone. Users expect an image quality and function on the same level as those of a digital camera to be implemented. To meet this expectation, the lens used on the portable terminal is required to have focusing and zooming functions in addition to the basic image capturing function.

To have such functions added, it is necessary to provide a lens drive device for moving the lens in the direction of optical axis. However, use of a general motor or actuator raises a problem of increasing the size of the lens drive device.

By contrast, lens drive devices have been disclosed wherein a shape memory alloy (hereinafter referred to as "SMA") actuator is used to reduce the size and weight thereof (Patent Literatures 1 through 3).

The SMA actuator uses the SMA whose shape is recovered to the state having been memorized by temperature changes. In Patent Literatures 1 through 3, self-heating takes place when the SMA is turned on, and a lens is driven by the force generated when the shape of the actuator is recovered to the memorized state. The force generated by the SMA actuator in this case is great enough to provide a compact and lightweight configuration for the lens drive device. In the lens drive device disclosed in the Patent Literatures 1 through 3, the force generated by the SMA actuator is transmitted to the direction of driving a lens using a lever mechanism.

Prior Art

Patent Literature

Patent Literature 1: Unexamined Japanese Patent Application Publication No. 2007-58075

Patent Literature 2: Unexamined Japanese Patent Application Publication No. 2007-58076

Patent Literature 3: Unexamined Japanese Patent Application Publication No. 2007-60530

SUMMARY OF THE INVENTION

Problems to be Solved by the Invention

However, the SMA actuator causes stress to be generated by phase transformation in a high-temperature environment. Thus, if a drive device using the SMA actuator is left in a high-temperature environment for a long time, the force generated by the SMA actuator continues to be applied to the lever mechanism during this time. If the portion receiving the force generated by the SMA actuator is made of a resin material alone as in the case of the lever member of Patent Literature 3, deformation such as creep may occur. This deformation leads to a failure in precise control of the drive device. This may further lead to a complete driving failure.

In view of the problems described above, it is an object of the present invention to provide a drive mechanism, drive device, and lens drive device characterized by a compact and lightweight structure and a low production cost, without the drive performances thereof being deteriorated even when these drive mechanism, drive device, and lens drive device are left in a high-temperature environment for a long time.

Means for Solving the Problems

The object of the present invention can be achieved by the following Structures.

1. A drive mechanism for driving a driven member including: a stationary support member;

a lever member having a displacement input portion for receiving a moving force from outside and a bearing portion for abutting on the support member so that the lever member engages with the driven member and swings about the bearing portion relative to the support member due to an input of the moving force to the displacement input portion, thereby moving the driven member in a predetermined first axis direction, and a shape-memory alloy actuator for applying the moving force to the displacement input portion; wherein the lever member comprises a displacement input member equipped with the displacement input portion, and a bearing member equipped with the bearing portion.

2. The drive mechanism described in Structure 1 wherein the aforementioned lever member is formed of a metallic material, and the displacement input member and bearing member are made of a plastic material.

3. The drive mechanism described in Structure 1 wherein the displacement input member and bearing member are integrally formed as one intermediate member.

4. The drive mechanism described in Structure 3 wherein the lever member is insert-molded into the intermediate member.

5. The drive mechanism described in Structure 1 wherein a linear actuator is provided as the aforementioned shape memory alloy actuator and this actuator bent in a V-shape is wound around the displacement input portion.

6. The drive mechanism described in Structure 1 wherein the shape memory alloy actuator is installed in such a way that the moving force in the second axial direction as the moving force is inputted into the displacement input portion.

7. The drive mechanism described in Structure 6 wherein a linear actuator is provided as the aforementioned shape memory alloy actuator, and this actuator is arranged inside the surface perpendicular to the aforementioned first axis direction.

8. The drive mechanism described in Structure 6 wherein the lever member is supported at the tip end of the support member on the bearing portion so that the lever member can swing, and the shape memory alloy actuator is provided so as to abut the lever member on the drive member in the non-operation mode.

9. A drive device including a driven member and the drive mechanism described in Structure 1 to move this driven member in a prescribed first axis direction.

10. A lens drive mechanism including a lens unit as a driven member and a drive mechanism described in Structure 1 as a drive mechanism to move this lens unit in the direction of optical axis.

Effects of the Invention

According to the present invention, a displacement input portion and bearing portion formed as separate members are provided on the surface of the aforementioned lever member. Accordingly, this present invention provides a drive mechanism, drive device, and lens drive device characterized by a compact and lightweight structure and a low production cost, without the drive performances thereof being deteriorated even when these drive mechanism, drive device, and lens drive device are left in a high-temperature environment for a long time.

BRIEF DESCRIPTION OF THE DRAWINGS

FIG. 2 is a side view

FIG. 3 is an explanatory diagram

DETAILED DESCRIPTION OF THE PREFERRED EMBODIMENT

The following describes the embodiments of the present invention with reference to the drawings.

Figure 1:
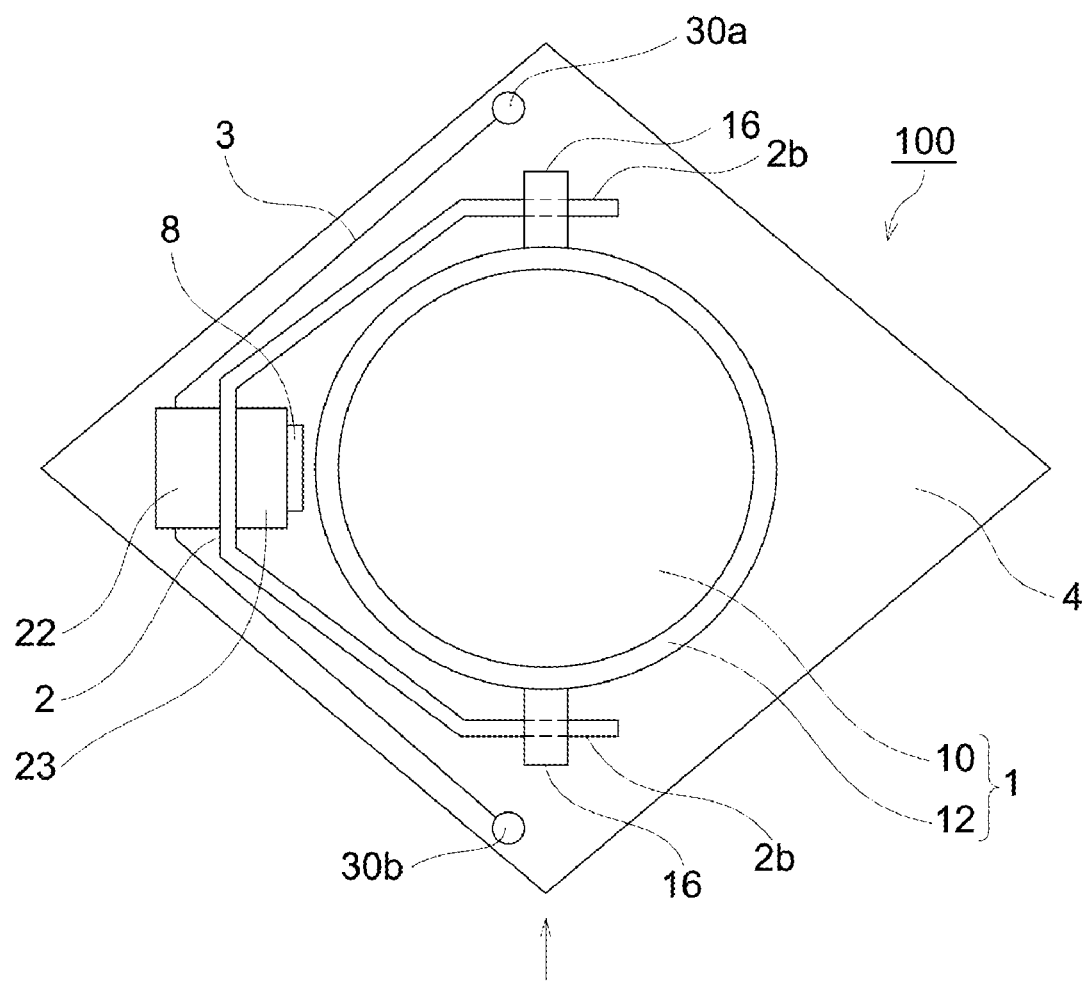
FIG. 1 is a plan view schematically showing the major components of a lens drive device 100 in the first embodiment of the present invention.

FIG. 1 is a plan view schematically showing the major components of a lens drive device 100 in the first embodiment of the present invention. FIG. 2 is a side view schematically showing the major components of a lens drive device 100 in the first embodiment of the present invention. FIG. 3 is an explanatory diagram of a lever member 2 in the first embodiment of the present invention.

The lens drive device 100 mainly includes a lens unit 1 (driven member), lever member 2 for moving the lens unit 1 in the direction of optical axis AX (first axial direction), SMA actuator 3, base member 4, upper plate 5, parallel plate springs 6a and 6b and bias spring 7, wherein the lens unit 1 is fitted into the base member 4. The upper plate 5 and parallel plate springs 6a and 6b are not illustrated in FIG. 1 for the sake of expediency.

The base member 4 is fixed onto the member on which the lens drive device 100 is mounted (e.g., frame or mount substrate of a cellular mobile telephone), and is the unmovable member constituting the base of the lens drive device 100. This base member 4 is formed in a quadrilateral plate, as viewed from the plane, and is made of a resin material.

The lens unit 1 is cylindrical and includes an image pickup lens 10 and a lens drive frame 12 for holding this image pickup lens 10. The image pickup lens 10 has an objective lens, focus lens, zoom lens and others, and constitutes an image forming optical system for a subject with respect to an image pickup element (not illustrated). The lens drive frame 12 is so-called the lens frame, and moves in the direction of optical axis AX together with the image pickup lens 10. A pair of support portions 16 having an angular difference of 180 degrees in the circumferential direction are provided in a protruded form on the outer edge of the top end of the lens drive frame 12.

The lens unit 1 inserted in the opening of the upper plate 5 is mounted on the base member 4. To put it in greater detail, a pair of support portions 16 is arranged in the vicinity of a pair of diagonals of the base member 4 (FIG. 1). The parallel plate springs 6a and 6b are fixed onto the base member 4 and upper plate 5, and the lens unit 1 is fixed to these parallel plate springs 6a and 6b. This arrangement allows the lens unit 1 to be supported displaceably with respect to the base member 4 and others, and the degree of freedom in displacement is regulated in the direction of optical axis AX. The upper plate 5 can be fixed on the base member 4 through the stay and others (not illustrated) or can be formed integral with the base member 4. The upper plate 5 is an unmovable member in the same manner as the base member 4.

The lever member 2 engages with the lens unit 1 through the support portions 16, whereby the lens unit 1 is driven in the direction of optical axis AX.

As shown in FIG. 1, the lever member 2 is mounted on the side of the lens unit 1. To put it more specifically, the lever member 2 is mounted on one of the corners of the base member 4 except for the corner wherein the support portions 16 of the lens unit 1 are located. In this embodiment, to reduce the size of the lens drive device 100, the lever member 2 is formed of a metallic plate stock and is arranged in a gap between the rectangular sides of the lens unit 1 and base member 4, as shown in FIG. 1.

Figure 3A:
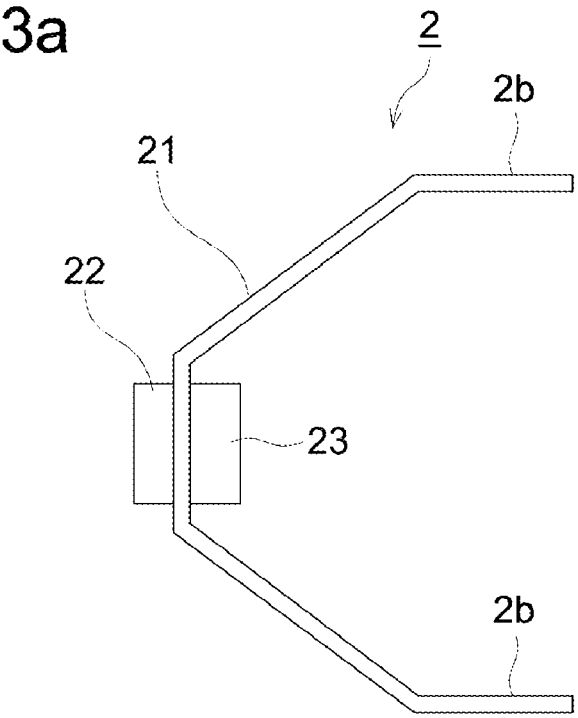
FIGS. 3a, 3b, and 3c are explanatory diagrams of a lever member 2 in the first embodiment of the present invention.
Figure 3B:
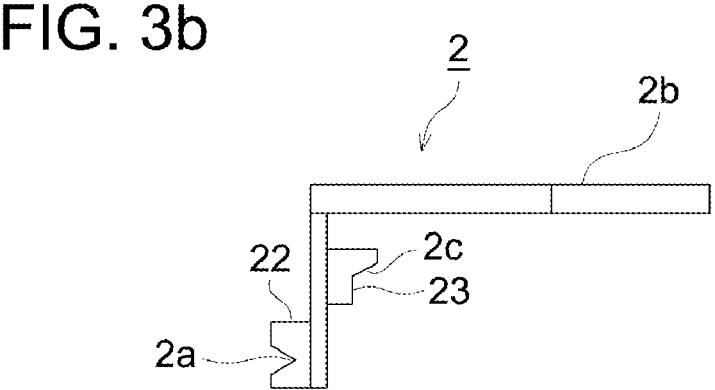
Figure 3C:
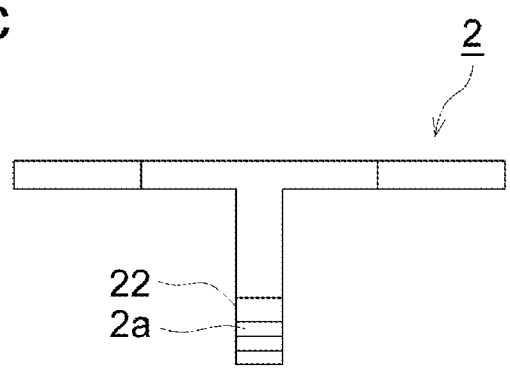

The following describes the lever member 2 with reference to FIG. 3. FIG. 3a is a plan view showing the lever member 2. FIG. 3b is a side view showing the lever member 2. FIG. 3c is a front view showing the lever member 2 as viewed from the first extension 22.

As shown in FIG. 3, the resin-made first extension 22 and second extension 23 are bonded onto the surface of the lever member 2. In FIG. 3, 2a is a displacement input portion, 2b is a displacement output portion, and 2c is a bearing portion.

The first extension 22 is used to apply an SMA wire 3 to the lever member 2. The displacement input portion 2a is designed in a complicated shape consisting of a plurality of curvature radiuses in order to minimize the friction at the portion in contact with the SMA wire 3. The first extension 22 provides a displacement input portion of the present invention.

The lever member 2 is perpendicular to the optical axis AX and is supported around the axial line extending in the direction wherein a pair of the aforementioned support portions 16 are arranged (in the vertical direction in FIG. 1) so that the lever member 2 can swing. The second extension 23 is in contact with the lever leg 8, and provides a fulcrum when the lever member 2 swings. The bearing portion 2c in contact with the tip end of the lever leg 8 (hereinafter referred to as "lever support 8a") is shaped to have complicated flexures in order to minimize friction with the level support 8a. The second extension 23 is a bearing member of the present invention.

As described above, the first extension 22 and second extension 23 must be designed in a small and complicated configuration. In the present embodiment, the first extension 22 and second extension 23 are produced by molding the resin material. It should be noted, however, that the material forming the first extension 22 and second extension 23 is not restricted to resin. For example, the material forming the first extension 22 and second extension 23 can be produced by casting a metallic material.

Figure 2A:
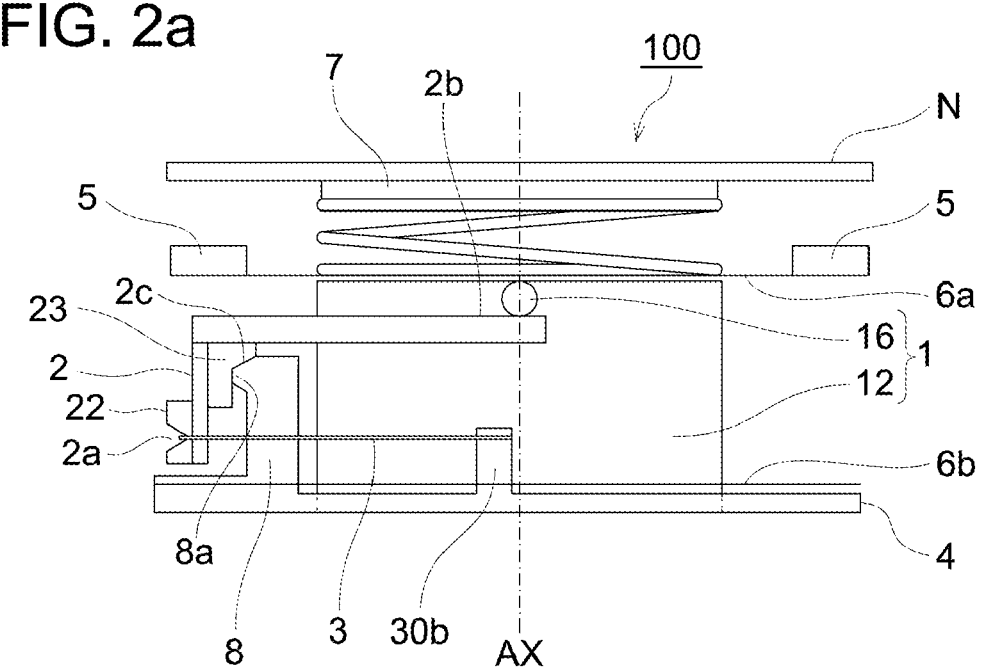
FIGS. 2a and 2b are side views schematically showing the major components of a lens drive device 100 in the first embodiment of the present invention.

As shown in FIG. 2a, the lever member 2 is designed in an inverted L-shape, as viewed from the side. Since the bearing portion 2c of the second extension 23 is supported at the tip end of the lever leg 8 standing on the base member 4, the lever member 2 is supported on the base member 4. The lever support 8a is designed in an approximately cylindrical shape that extends in the direction perpendicular to the direction of optical axis AX (in the direction perpendicular to the paper surface of FIG. 2a). This design ensures the lever member 2 to be supported so as to swing about the axial line perpendicular to the direction of optical axis AX using the lever support 8a as a fulcrum.

As shown in FIG. 1, the lever member 2 branches off in two from the second extension 23 toward both sides of the lens unit 1. Each of the branches comes closer to the outer peripheral surface of the lens unit 1 and extends uniformly to enclose 50 percent of one side of the lens unit 1 as a whole. Each of the displacement input portions 2b on both the tip ends of the lever member 2 reaches each of the support portions 16 of the lens unit 1. Then the SMA actuator 3 (to be described later) is applied to the first extension 22 arranged on the surface of the lever member 2. The lever member 2 swings when the moving force F1 in the direction perpendicular to the direction of optical axis AX (in the direction of second axis, i.e., in the longitudinal direction of FIG. 2) has been inputted into the displacement input portion 2a wherein the SMA actuator 3 is applied. The swing'operation causes the tip end of the lever member 2 to be displaced in the direction of optical axis AX. Then the displacement input portion 2b engages with each of the support portions 16 so that the drive force in the direction of optical axis AX is given to the lens unit 1.

As described above, in the present embodiment, the moving force F1 is inputted to the lever member 2 made of a metallic material through the displacement input portion 2a, and the drive force in the direction of optical axis AX is given to the lens unit 1 wherein the bearing portion 2c provided on the lever member 2 is used as a fulcrum.

The metallic plate selected for use in the lever member 2 is required to have such thickness and strength as to ensure that the deformation is not caused by the external force applied to the lever member when the lens unit 1 is driven. The metallic material that can be used includes iron, brass, and aluminum, for example.

The SMA actuator 3 provides the lever member 2 with the moving force F1, and is exemplified by a linear actuator made of the wire of the shape memory alloy (SMA) such as Ni—Ti alloy. This SMA actuator 3 elongates when a prescribed tension is given at a low temperature with a low elastic modulus (martensite phase). If heat is applied in the elongated state, the SMA actuator 3 shifts to the state of a high elastic modulus (austenite phase) so that the SMA actuator 3 goes back to the original state from the elongated state (recovery of shape). In the present embodiment, the aforementioned phase transformation is carried out when the SMA actuator 3 is heated by the application of electric power. To be more specific, since the SMA actuator 3 is a conductor having a prescribed resistance, Joule heat is generated when power is supplied to the SMA actuator 3, and transformation is carried out from the martensite phase to the austenite phase by self-heat generation based on the Joule heat. Thus, a first electrode 30a and second electrode 30b for heating by power application are fixed on both sides of the SMA actuator 3. The first electrode 30a and second electrode 30b are fastened to a prescribed electrode fixing section provided on the base member 4.

As shown in FIG. 1, the SMA actuator 3 is wound around the displacement input portion 2a of the lever member 2 so as to be folded back in a V-shape. This arrangement allows the SMA actuator 3 to be heated by the application of electric power through the electrodes 30a and 30b. When the SMA actuator 3 has been operated (contracted), the moving force F1 is supplied to the lever member 2, and the lever member 2 swing by the moving force F1.

The electrodes 30a and 30b are arranged in the vicinity of the support portions 16 of the lens unit 1 in the base member 4. Lengths are set at the same level from the electrodes 30a and 30b to the turnaround point in the SMA actuator 3. This provides the same amounts of expansion and contraction of the SMA actuators 3 on both sides of the displacement input portion 2a, and prevents abrasion from occurring between the lever member 2 and SMA actuator 3 when the SMA actuator 3 has operated.

The displacement input portion 2a is formed in the V-shape, and the SMA actuator 3 is applied to the displacement input portion 2a so as to fit therein, whereby the SMA actuator 3 is stably suspended on the lever member 2.

The bias spring 7 biases the lens unit 1 in the direction of optical axis AX, i.e., in the direction opposite to the direction in which the displacement input portion 2b of the lever member 2 is moved by the operation of the SMA actuator 3. The bias spring 7 is made of the compressed coil spring having a diameter approximately the same as the edge size of the lens drive frame 12. One side (lower end side) abuts on the peaked surface of the lens drive frame 12. The other side (upper end side) of the bias spring 7 abuts on the unmovable portion N such as the inner surface of a cellular mobile telephone housing.

The potency of the bias spring 7 is assumed to be smaller than the moving force F1 given to the lever member 2. When the SMA actuator 3 is not operating, the lens unit 1 is pressed against the base member 4. When the SMA actuator 3 has operated, the lens unit 1 moves in the opposite direction (toward the objective) against the pressure of the bias spring 7. To be more specific, the bias spring 7 provides the lens unit 1 with a bias load for returning the lens unit 1 to the home position when the SMA actuator 3 is not heated by the application of electric power.

In the non-operation mode, the line length of the SMA actuator 3 is determined so that tension will be given to the SMA actuator 3 by receiving the pressure of the bias spring 7 working through the lens unit 1 (support portion 16) and lever member 2. To be more specific, the line length is determined so that the displacement input portion 2b of the lever member 2 abuts on (is pressed against) the lens unit 1 (support portion 16), independently of the operation status. This arrangement allows the lever member 2 to be supported on the tip end of the lever leg 8 so that the lever member 2 can swing, without directly connecting the lever leg 8 to the lever member 2, in the present embodiment. When the SMA actuator 3 is working, the displacement is quickly transferred to swing the lever member 2.

Figure 2B:
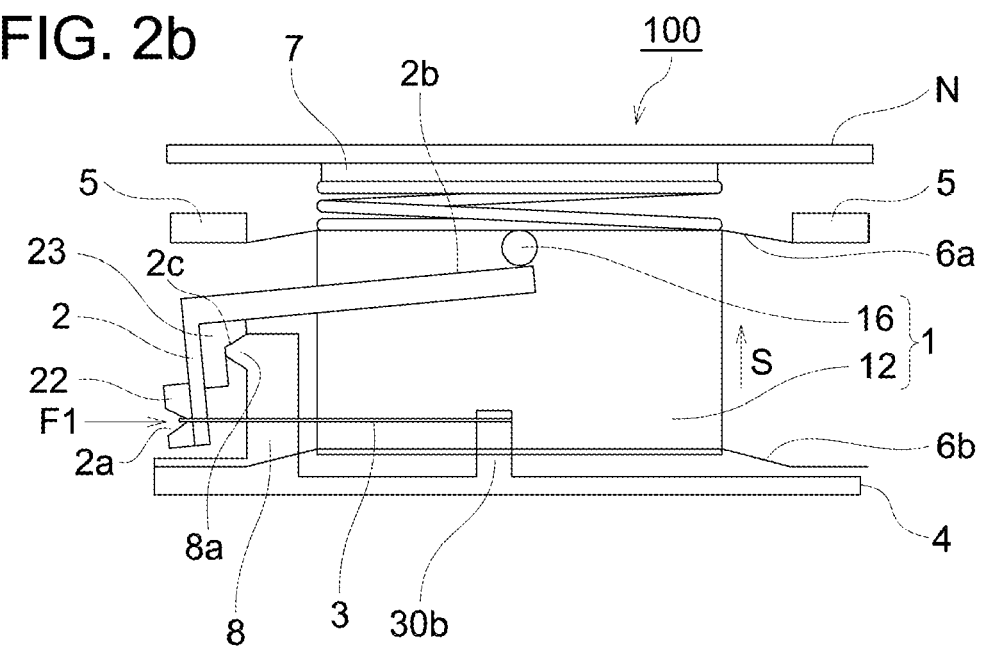

In the lens drive device 100, when stopping the SMA actuator 3 (at the time of elongation) which is not heated by the application of electric power, the lens unit 1 is pressed against the base member 4 by the pressure of the bias spring 7, whereby the lens unit 1 is held at the home position (FIG. 2a). In the meantime, when the SMA actuator 3 has operated (contracted), the moving force F1 is supplied to the displacement input portion 2a of the lever member 2, and the lever member 2 swings. This swing operation causes the displacement input portion 2b to be moved in the direction of optical axis AX (FIG. 2b). As a result, the lens unit 1 is supplied with the drive force to the objective side and the lens unit 1 moves against the pressure of the bias spring 7. In this case, the current applied to the SMA actuator 3 is placed under control so that the potency of the moving force F1 is regulated. As a result, the displacement of the lens unit 1 is regulated.

When the power supply to the SMA actuator 3 is stopped (or voltage is reduced to a prescribed level) and the SMA actuator 3 is cooled so that the martensite phase is restored, the moving force F1 turns off, and the lens unit 1 is reset by the pressure of the bias spring 7 to the home position by moving in the direction of optical axis AX. Thus, the lens unit 1 can be displaced in the direction of optical axis AX by the power on-off operation for the SMA actuator 3. Further, the current supplied to the SMA actuators 3a and 3b is placed under control, and the potency of the moving force F1 is regulated, whereby the displacement of the lens unit 1 can be adjusted.

As described above, in the lens drive device 100 using the drive mechanism of the present invention, the lens unit 1 can be moved effectively in the direction of optical axis AX in response to the operation of the SMA actuator 3. Further, even when the lens drive device 100 has been left in a high-temperature environment for a long time, a creep does not occur since the lever member 2 is made of metal. Thus, even when the lens drive device 100 has been left in a high-temperature environment for a long time, the lever member 2 is not deformed by the force generated by the SMA actuator and the drive performance is not deteriorated. Further, since the lever member 2 is formed by working the metallic plate, the lens drive device 100 can be designed in a compact configuration characterized by lower production costs.

Figure 4A:
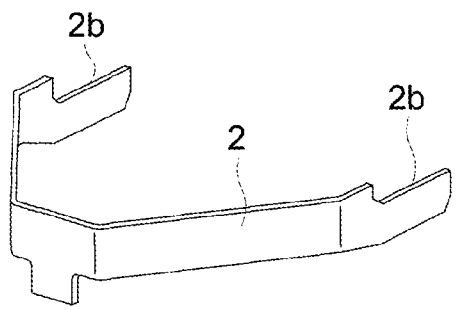
FIGS. 4a, 4b, 4c, and 4d are perspective views of a lever member 2 and intermediate member 24 in the second embodiment of the present invention.
Figure 4B:
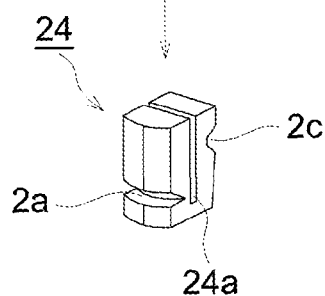
Figure 4C:
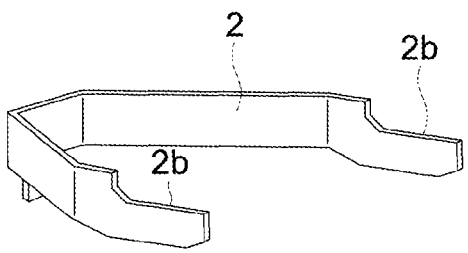
Figure 4D:
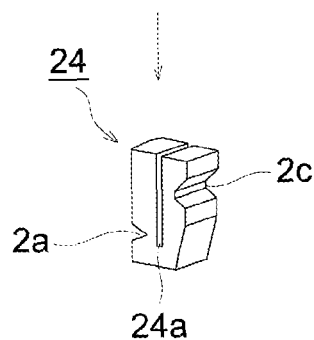
Figure 5:
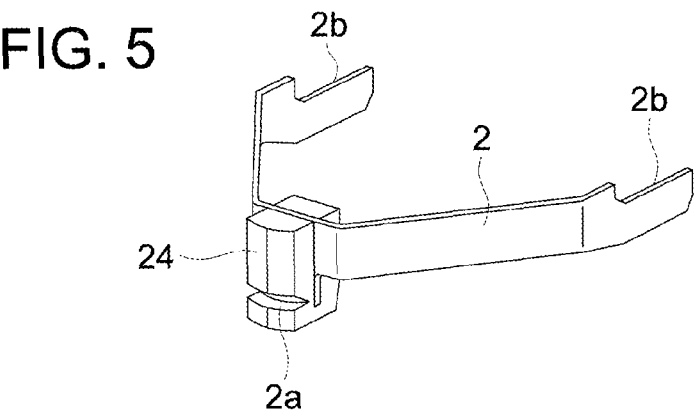
FIG. 5 is a perspective view of a lever member 2 and intermediate member 24 integrated into one structure in the second embodiment of the present invention.

The following describes the drive mechanism of the second embodiment with reference to FIGS. 4 and 5.

In the second embodiment, the drive mechanism uses the intermediate member 24 wherein the displacement input portion 2a and bearing portion 2c are formed in one integral member. The drive mechanism also uses the lever member 2 and intermediate member 24 formed in one integral member, as shown in FIG. 5.

FIGS. 4a and 4c are the perspective views of the lever member 2. FIG. 4a is a perspective view, as seen from the displacement input portion 2a. FIG. 4c is a perspective view, as seen from the displacement input portion 2c. FIGS. 4b and 4d are the perspective views of the intermediate member 24. FIG. 4b is a perspective view, as seen from the displacement input portion 2a. FIG. 4d is a perspective view, as seen from the displacement input portion 2c. FIG. 5 is a perspective view representing that the lever member 2 and intermediate member 24 are formed into one integral piece.

Similarly to the case of the first embodiment, the lever member 2 of the second embodiment is formed by working the metallic plate. This is slightly different from the lever member 2 illustrated in FIGS. 4 and 5. The lever member 2 of the second embodiment has the same function as that of the first embodiment.

The intermediate member 24 is formed by resin, and is provided with the displacement input portion 2a, bearing portion 2c, and groove 24a. When the lever member 2 is moved in the direction shown by an arrow in the drawing and is pressed into the groove 24a, the lever member 2 and intermediate member 24 are made into one integral piece, as shown in FIG. 5. Thus, similarly to the case of the first embodiment, the displacement input portion 2a and bearing portion 2c made of resin are provided on the surface of the lever member 2.

If the shape and position are made equivalent to those of the displacement input portion 2a and bearing portion 2c, the lever member 2 of the second embodiment can also be incorporated into the lens drive device 100 described with reference to FIGS. 1 and 2. Similarly, the lens unit 1 can be driven. The operation of the lens drive device 100 is the same as that of the first embodiment, and the description is omitted.

In the first embodiment, the first extension 22 and second extension 23 are mounted on the lever member 2. In the present embodiment, by contrast, it is only required to mount the intermediate member 24 alone. This arrangement reduces the number of parts and the number of man-hours for assembling. Further, if the lever member 2 is formed by being insert-molded into the intermediate member 24, the assembling process is simplified, and production costs are reduced.

Further, the present embodiment enhances the precision in relative positions of the displacement input portion 2a and bearing portion 2c. This reduces variations in the fluctuation of the displacement of the lens unit 1 with respect to the moving force F1, with the result that control of the drive device is facilitated.

The present invention described above provides a drive mechanism, drive device, and lens drive device characterized by a compact and lightweight structure and a low production cost, without the drive performances thereof being deteriorated even when these drive mechanism, drive device, and lens drive device are left in a high-temperature environment for a long time.

DESCRIPTION OF REFERENCE NUMERALS
1. Lens unit
2. Lever member
2a. Displacement input portion
2b. Displacement output portion
2c. Bearing portion
3. SMA actuator
4. Base member
5. Upper plate
6. Plate spring
7. Bias spring
8. Lever leg
10. Lens
12. Lens drive frame
16. Support portion
21. Arm
22. First extension
23. Second extension
24. Intermediate member
24a. Groove
30. Electrode
40. Extension
100. Lens drive device

The invention claimed is:

1. A drive mechanism for driving a driven member comprising:
a stationary support member;
a lever member which engages with the driven member and moves the driven member;
a bearing member formed of a material different from that of the lever member, provided on the lever member, and having a bearing portion for abutting on the support member;
a displacement input member formed of a material different from that of the lever member, provided on the lever member, and having a displacement input portion for receiving a moving force from outside; and
a shape-memory alloy actuator for applying the moving force to the displacement input portion;
wherein the lever member is configured to swing about the bearing portion due to an input of the moving force to the displacement input portion.

2. The drive mechanism according to claim 1 wherein the lever member is formed of a metallic material, and the displacement input member and bearing member are made of a plastic material.

3. The drive mechanism according to claim 1 wherein the displacement input member and bearing member are integrally formed as one intermediate member.

4. The drive mechanism according to claim 3 wherein the lever member is insert-molded into the intermediate member.

5. The drive mechanism according to claim 1 wherein a linear actuator is provided as the shape memory alloy actuator and the actuator bent in a V-shape is wound around the displacement input portion.

6. The drive mechanism according to claim 1 wherein the shape memory alloy actuator is installed in such a way that a moving force in a second axial direction as the moving force is inputted into the displacement input portion.

7. The drive mechanism according to claim 6 wherein a linear actuator is provided as the shape memory alloy actuator, and the actuator is arranged inside a surface perpendicular to a direction in which the driven member is driven.

8. The drive mechanism according to claim 6 wherein the lever member is supported at the tip end of the support member on the bearing portion so that the lever member can swing, and the shape memory alloy actuator is provided so as to abut the lever member on the drive member in a non-operation state.

9. A drive device comprising a driven member and the drive mechanism according to claim 1 to move the driven member in a predetermined first axis direction.

10. A lens drive mechanism comprising a lens unit as a driven member and the drive mechanism according to claim 1 as a drive mechanism to move the lens unit in a direction of optical axis.

* * * * *